US006690424B1

United States Patent
Hanagata et al.

(10) Patent No.: US 6,690,424 B1
(45) Date of Patent: Feb. 10, 2004

(54) EXPOSURE CONTROL APPARATUS FOR CONTROLLING THE EXPOSURE OF AN IMAGE PICKUP PLANE IN A CAMERA

(75) Inventors: Takashi Hanagata, Kanagawa (JP); Daisuke Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/044,247

(22) Filed: Mar. 19, 1998

(30) Foreign Application Priority Data

Mar. 19, 1997 (JP) .............................................. 9-066234

(51) Int. Cl.⁷ ............................................... H04N 5/238
(52) U.S. Cl. ...................................... 348/364; 348/234
(58) Field of Search .................................. 348/222, 229, 348/230, 234, 235, 237, 362, 364, 365, 366, 222.1, 229.1, 230.1; H04N 5/238

(56) References Cited

U.S. PATENT DOCUMENTS

| | | | | |
|---|---|---|---|---|
| 4,535,364 A | * | 8/1985 | Hirobe | 348/364 |
| 5,712,682 A | * | 1/1998 | Hannah | 348/255 |
| 5,966,175 A | * | 10/1999 | Inoue | 348/364 |
| 6,124,891 A | * | 9/2000 | Homma et al. | 348/364 |
| 6,175,384 B1 | * | 1/2001 | Homma | 348/363 |
| 6,480,226 B1 | * | 11/2002 | Takahashi et al. | 348/296 |

FOREIGN PATENT DOCUMENTS

| | | | | |
|---|---|---|---|---|
| JP | 3-70274 | * | 3/1991 | H04N/5/238 |
| JP | 03-220878 | * | 9/1991 | H04N/5/23 |

* cited by examiner

*Primary Examiner*—Tuan Ho
(74) *Attorney, Agent, or Firm*—Sonnenschein, Nath & Rosenthal LLP

(57) ABSTRACT

An exposure controller including a backlight correction calculator where the amount of incident light is integrated to obtain an average luminance of an entire image pickup plane, and the average luminance is multiplied by a predetermined factor to set a HIST reference level. In a HIST detector, an object scene portion in the image pickup plane is separated from a background portion on the basis of the HIST reference level, and the average luminance of the object scene portion is detected. Further the difference between the average luminance of the entire plane and that of the object scene portion is calculated in the backlight correction calculator, and gain control is executed with respect to the calculated luminance difference to thereby obtain a backlight correction quantity. Then automatic exposure is performed in accordance with such backlight correction quantity, hence ensuring exact prevention of a phenomenon that the object scene in a backlight state is rendered dark. This exposure controller is adapted for down-sizing a software processor while eliminating the necessity of any complicated process such as functional operation.

17 Claims, 8 Drawing Sheets

ONLY THIS PORTION IS DETECTED

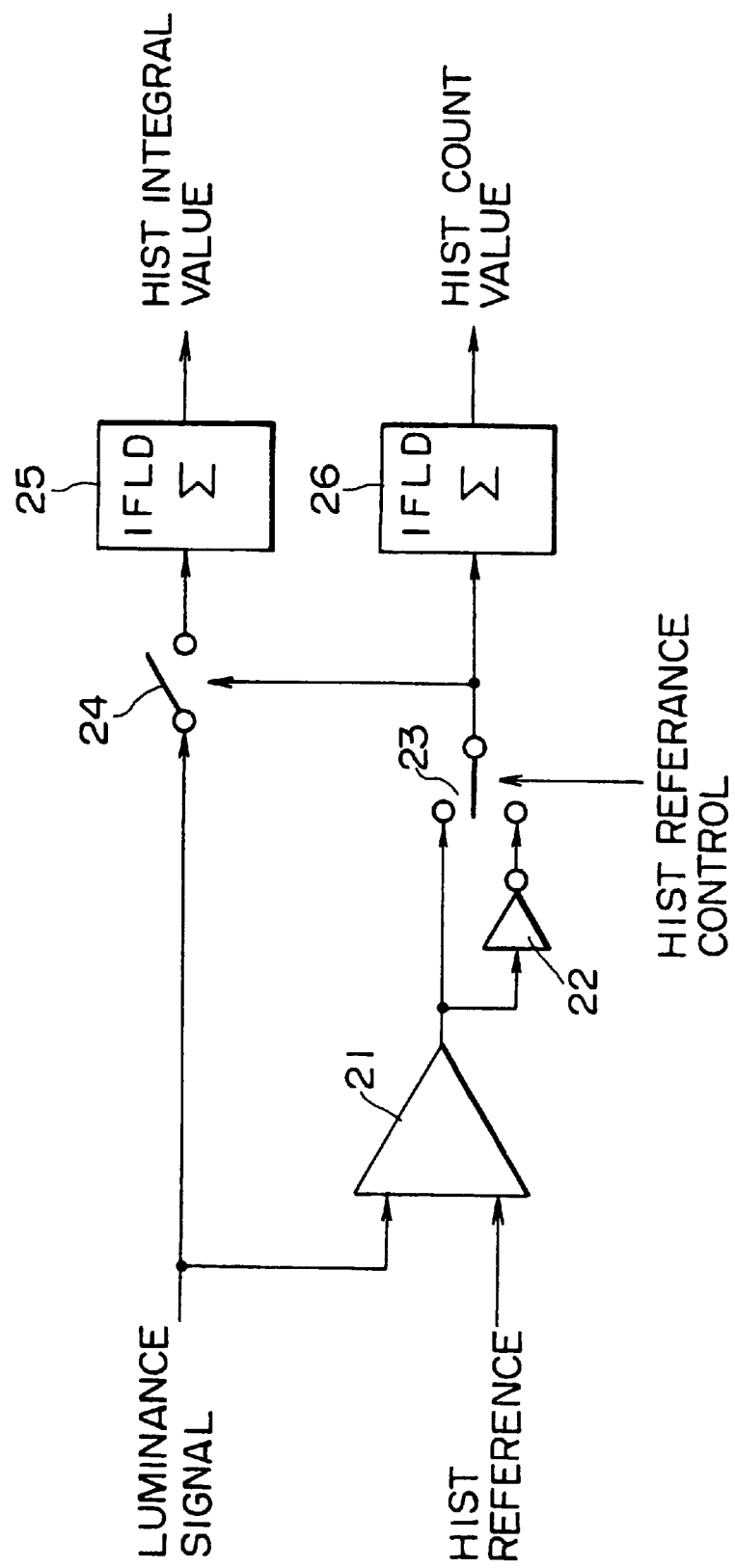

BACKLIGHT CORRECTION CALCULATOR

AE CONTROL LOOP

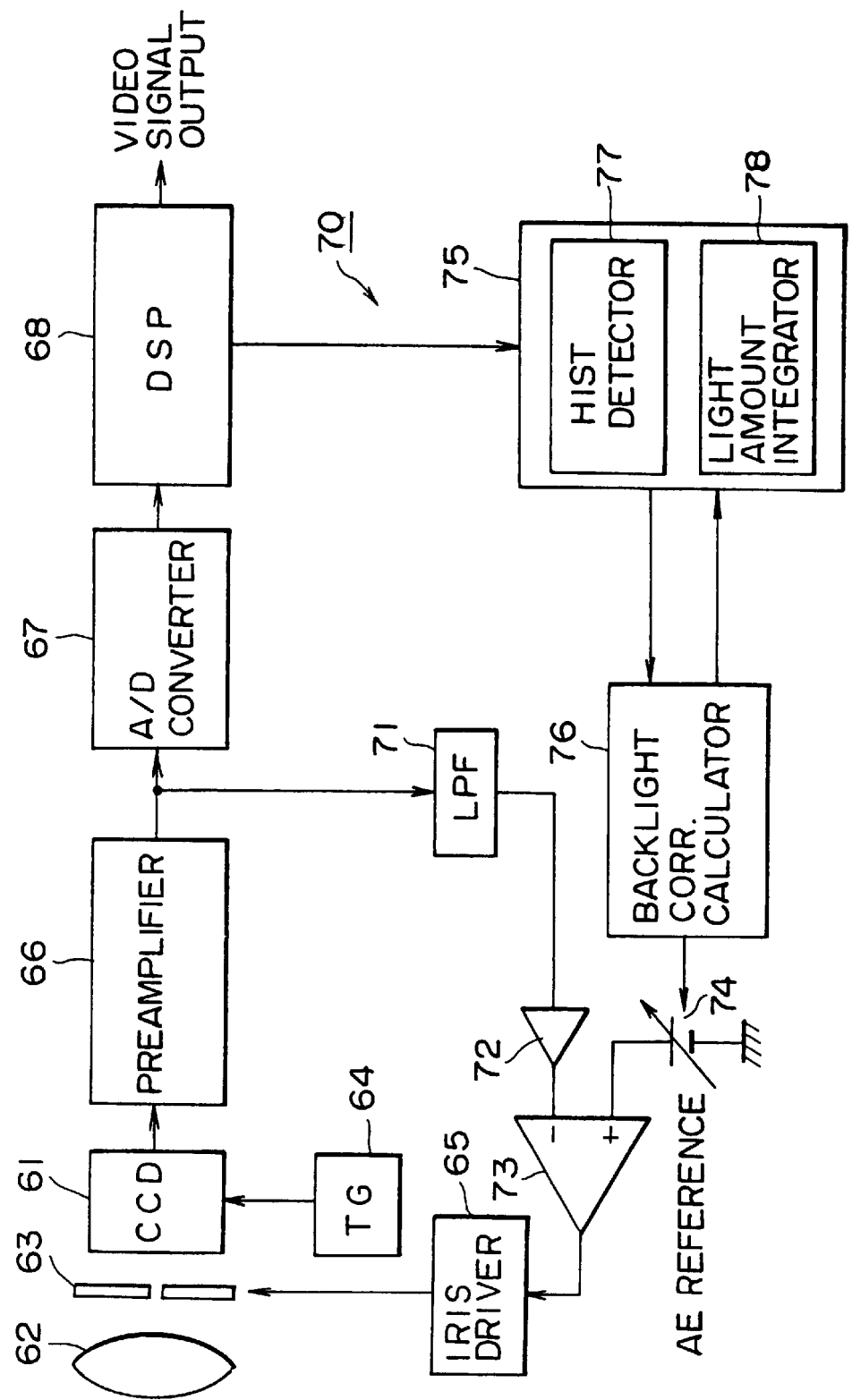

EXPOSURE CONTROL APPARATUS FOR CONTROLLING THE EXPOSURE OF AN IMAGE PICKUP PLANE IN A CAMERA

BACKGROUND OF THE INVENTION

1. Field of the Invention

The present invention relates to an exposure controller, an exposure control method and a camera using the same for automatically controlling the brightness of an image pickup plane, and more particularly to an exposure controller, an exposure control method and a camera equipped with a backlight correcting function.

2. Description of the Related Art

In a camera employing a solid-state image sensor with a CCD or the like as an image pickup device, there is provided an automatic exposure (AE) controller having a backlight correcting function to correct an undesired phenomenon that, when a person at a window for example is shot indoors, the person's face is rendered extremely dark due to the outdoor brightness. Relative to techniques for such correction of backlight, there is known a method of dividing an image pickup plane into a plurality of frames to detect the amounts of light, then weighting the amount of light in each frame, and taking the weighted average. Another method applying the fuzzy theory is also known.

Out of such backlight correction methods mentioned in the related art, the method of taking the weighted average is disadvantageous in the point that a proper exposure fails to be attained depending on the position of each frame for detecting the amount of light and the position of an object scene. Meanwhile in another method applying the fuzzy theory, there exists a problem that, although a burden of software can be diminished, some difficulties are unavoidable in down-sizing a software processor beyond a certain degree.

SUMMARY OF THE INVENTION

It is therefore an object of the present invention to provide improvements in an exposure controller, an exposure control method and a camera adapted for down-sizing a software processor while eliminating the necessity of any complicated process such as functional operation.

According to one aspect of the present invention, there is provided an exposure controller which comprises a detection means for separating an image pickup plane into an object scene portion and a background portion, and detecting the brightness of the object scene portion; and a control means for executing an exposure control action on the basis of the output of the detection means.

In the exposure controller of the above structure, the detection means separates an image pickup plane into an object scene portion and a background portion, and then detects the brightness of the object scene portion to thereby detect the backlight condition of the object scene portion. And the control means executes its exposure control action in accordance with the brightness degree of the object scene portion. Thus, due to such exposure control conforming with the brightness of the object scene portion alone, the object scene being shot in a backlight state is not rendered dark despite the backlight.

According to another aspect of the present invention, there is provided an exposure control method which comprises a step of detecting the average luminance of the entirety of an image pickup plane and then setting first and second reference levels on the basis of such average luminance; a step of separating the image pickup plane into an object scene portion and a background portion on the basis of the first and second reference levels and then detecting the average luminance of the object scene portion; a step of calculating the difference between the average luminance of the entire plane and that of the object scene portion; and a step of executing an exposure control action on the basis of such luminance difference.

In this exposure control method, the average luminance of the entire plane is detected by integrating the light amount, and subsequently first and second reference levels are set through multiplication of the average luminance by predetermined ratios. The image pickup plane is separated into an object scene portion and a background portion on the basis of such first and second reference levels, and the average luminance of the object scene portion is detected. Thereafter the difference between the average luminance of the entire plane and that of the object scene portion is calculated. Since this luminance difference represents the difference between the brightness of the entire plane and that of the object scene portion, an exposure control action is executed on the basis of this luminance difference. In this manner, there is achieved an advantage that, due to such exposure control conforming with the brightness of the object scene portion alone, the object scene being shot in a backlight state is not rendered dark despite the backlight.

According to a further aspect of the present invention, there is provided a camera which comprises an image sensor for converting incident light into an electric signal and outputting the same; an optical system for guiding the incident light from an object scene onto an image pickup plane of the image sensor; a signal processing means for processing the output signal of the image sensor; a detection means for separating the image pickup plane into an object scene portion and a background portion on the basis of the signal supplied from the signal processing means, and then detecting the brightness of the object scene portion; and a control means for executing the exposure control with respect to the image sensor on the basis of the output of the detection means.

In the camera of the above structure, incident light from an object scene is guided by the optical system onto the image pickup plane of the image sensor, and then is converted into an electric signal by the image sensor. The output signal of the image sensor is processed in the signal processing means and then is outputted therefrom as a video signal. Meanwhile the detection means separates the image pickup plane into an object scene portion and a background portion on the basis of the signal obtained from the signal processing means, and then detects the brightness of the object scene portion to thereby detect the backlight condition of the object scene portion. And subsequently the control means executes its exposure control action in accordance with the brightness degree of the object scene portion. Thus, due to such control of the exposure conforming with the brightness of the object scene portion alone, the object scene being shot in a backlight state is not rendered dark despite the backlight.

The above and other features and advantages of the present invention will become apparent from the following description which will be given with reference to the illustrative accompanying drawings.

BRIEF DESCRIPTION OF THE DRAWINGS

FIG. 4 is a block diagram showing a structural example of a HIST detection circuit;

FIG. 10 is a fundamental block diagram of a whole system representing another embodiment of the present invention.

DESCRIPTION OF THE PREFERRED EMBODIMENTS

Hereinafter some preferred embodiments of the present invention will be described in detail with reference to the accompanying drawings.

Figure 1:
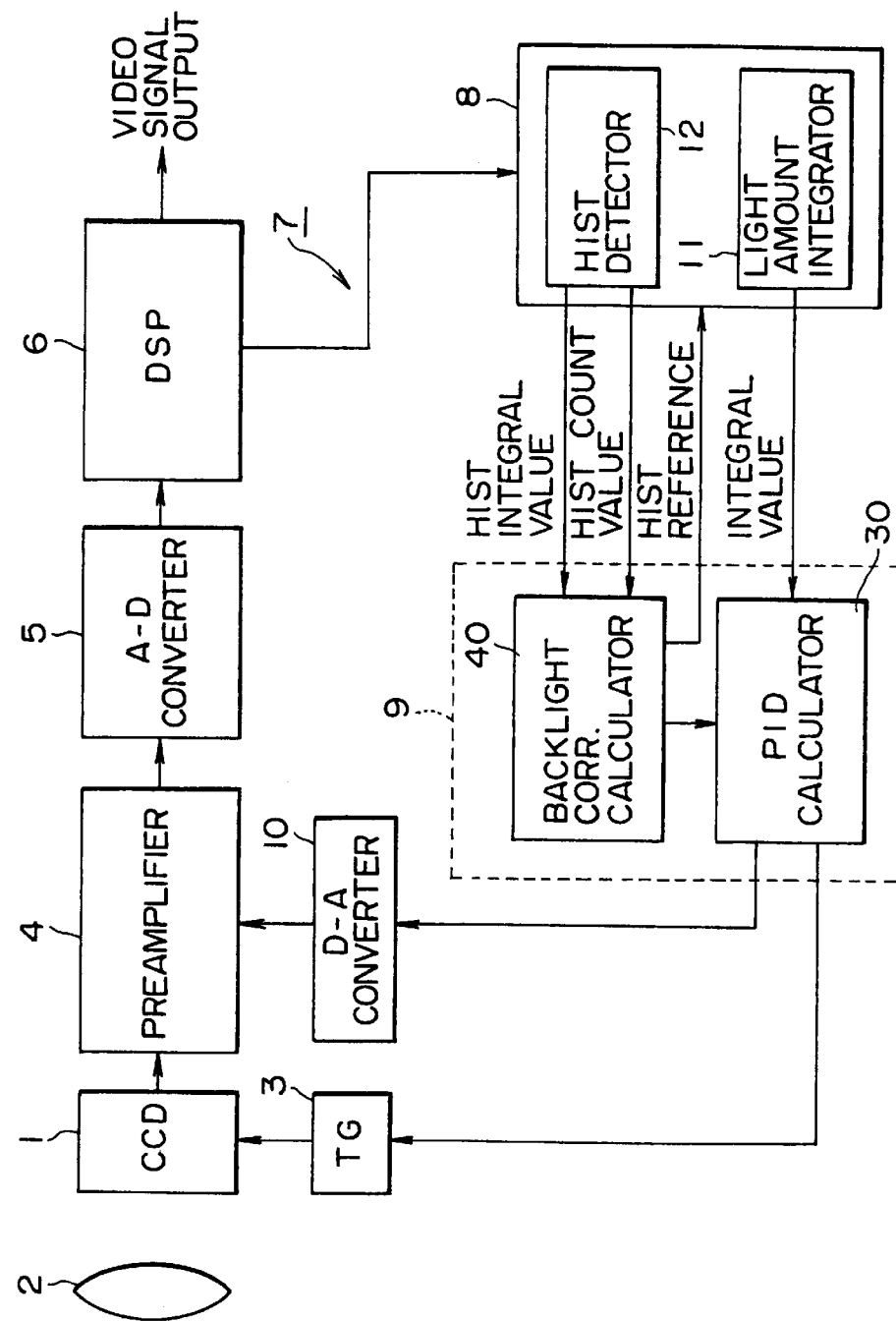
FIG. 1 is a fundamental block diagram of a whole system representing an embodiment of the present invention.

FIG. 1 is a fundamental block diagram of a whole system representing an embodiment of a camera of the present invention. In this diagram, incident light from an object scene to be shot falls on an image pickup plane of a solid-state image sensor such as a CCD image sensor 1 via a lens 2. The CCD image sensor 1 controls an exposure time (shutter speed), reading of signal charge, vertical transfer and horizontal transfer thereof in response to various timing signals generated from a timing generator (TG) 3, thereby converting the incident light into an electric signal of each unit pixel and outputting the same as an image signal.

The image signal thus outputted from the CCD image sensor 1 is supplied to a preamplifier 4, where the signal component is sampled and held, and further automatic gain control (AGC) is performed for adjustment to a proper level. The image signal obtained in an analog form through the preamplifier 4 is converted into a digital signal by an A-D converter 5 and then is supplied to a digital signal processor (DSP) 6, where the signal is processed in predetermined manners and is outputted as a video signal.

An exposure controller 7 is provided to execute automatic exposure (AE) control inclusive of backlight correction. This exposure controller 7 consists of a signal detector 8 for detecting a luminance signal supplied thereto from the DSP 6, and a software processing circuit 9 for processing the detection output of the signal detector 8 with software. The exposure controller 7 controls the shutter speed of the CCD image sensor 1 via the timing generator 3 and also the gain of the preamplifier 4 via a D-A converter 10 to thereby execute automatic exposure control (hereinafter referred to as AE control) inclusive of backlight correction.

Figure 2:
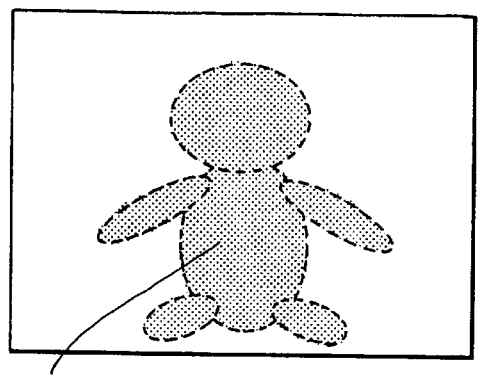
FIG. 2 illustrates an example of an object scene to be shot in a backlight state.

Now an explanation will be given below on the backlight correction performed in the exposure controller 7. FIG. 2 illustrates an example of an object scene to be shot in a backlight state. In most cases, the object scene in a backlight state is a relatively dark portion of low luminance level in the entire image pickup plane, while the background is a relatively light portion of high luminance level close to a white clip. Thus, in a backlight state, a luminance level difference is existent between the object scene portion and the background portion in the image pickup plane. Therefore, utilizing such level difference, the portion having any luminance lower than the average luminance of the entire plane is regarded as a principal object scene portion, and AE control is executed merely with reference to the luminance level of this portion alone to perform the backlight correction.

Figure 3A:
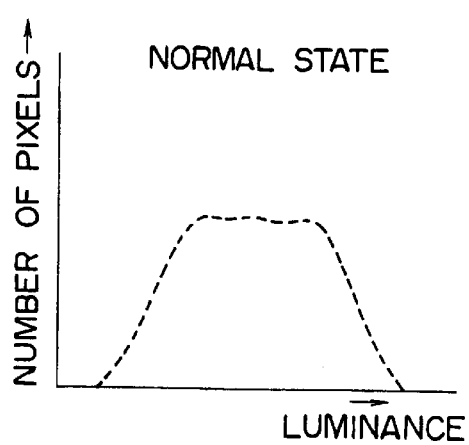
FIG. 3A is a characteristic diagram graphically showing a distribution of the number of pixels to the luminance in a normal state.
Figure 3B:
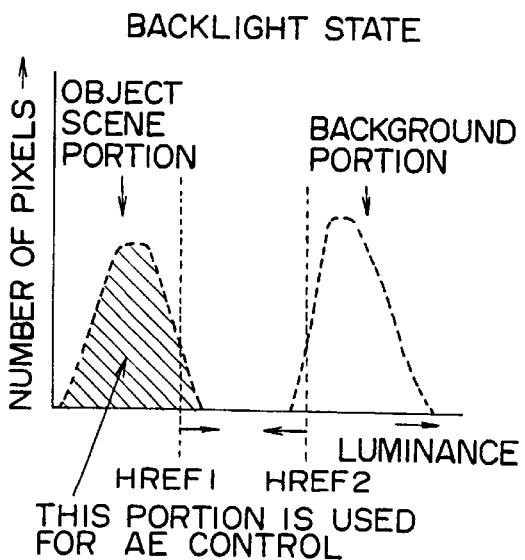
FIG. 3B is another characteristic diagram graphically showing a distribution of the number of pixels to the luminance in a backlight state.

In a normal state, as shown in FIG. 3A, the luminance distribution of the object scene is substantially uniform. However, in a backlight state, as shown in FIG. 3B, there occurs a luminance level difference between the object scene portion and the background portion. Using such luminance level difference as a key, the signal detector 8 detects the size of the object scene portion and the luminance level thereof so as to separately extract the plane area of relatively low luminance as a principal object scene portion.

The signal detector 8 consists of a light amount integration circuit 11 for executing simple integration of a luminance signal supplied from the DSP 6 and obtaining a simple integral value (light amount); and a HIST detection circuit 12 for executing histogram (hereinafter referred to as HIST) detection of the luminance signal. In the HIST detection circuit 12, a HIST integral value and a HIST count value (counted number of pixels) are obtained through HIST detection of the luminance signal.

As shown in FIG. 4, the HIST detection circuit 12 consists of a comparator 21 which receives the luminance signal and the HIST reference level as its two inputs, an inverter 22 for inverting the output of the comparator 21, a selector switch 23 for selecting either the output of the comparator 21 or the output of the inverter 22, a gate switch 24 turned on or off under control of the output of the selector switch 23, an integrator 25 for integrating the luminance signal supplied thereto via the gate switch 24, and an integrator 26 for integrating either the output of the comparator 21 or the output of the inverter 22 selected by the switch 23.

In the HIST detection circuit 12 of the configuration mentioned, the comparator 21 outputs a comparison result of a high level (logical 1) when the luminance signal is above the HIST reference level, or a comparison result of a low level (logical 0) when the luminance signal is below the HIST reference level. The output of the comparator 21 is supplied via the selector switch 23 to the integrator 26, where a HIST count value (counted number of pixels) is obtained by integrating the comparator output for a period of one field. Meanwhile, when the output of the comparator 21 is at a high level, the gate switch 24 is turned on, and a HIST integral value is obtained by integrating, for a period of one field in the integrator 25, the luminance signal supplied thereto via the gate switch 24 in its on-state.

Under HIST reference control, the selector switch 23 is kept in one state for selecting the output of the comparator 21 or in another state for selecting the output of the inverter 22. The above description of the operation represents an exemplary case where the selector switch 23 is kept in one state for selecting the output of the comparator 21. In the other case where the output of the inverter 22 is selected, the gate switch 24 is placed in its on-state when the luminance signal is below the HIST reference level, so that the luminance signal is supplied to the integrator 25. The HIST integral value and the HIST count value are outputted while the data are latched per field.

In the operation mentioned, the number of pixels and the integral value of the luminance signal above or below the HIST reference level are obtained. The number of pixels corresponds to the area occupied by the pixels, and the integral value corresponds to the light amount. If the HIST reference level is set to a proper value, it becomes possible to separately detect the areas and the light amounts of the object scene portion and the background portion having a great luminance level difference therebetween. AE control conforming with the light amount of the object scene portion can be achieved by inputting to a known AE control loop the integral value of the object scene portion detected separately as described.

Although merely one series of the HIST detection circuit is shown in FIG. 4, it is necessary to provide, for separation of the object scene and the background, two series of HIST detection circuits to separately detect the object scene portion and the background portion. Consequently, two HIST reference levels 1 and 2 are required correspondingly thereto. Setting of such two HIST reference levels 1 and 2 will be described later in detail.

Figure 5:
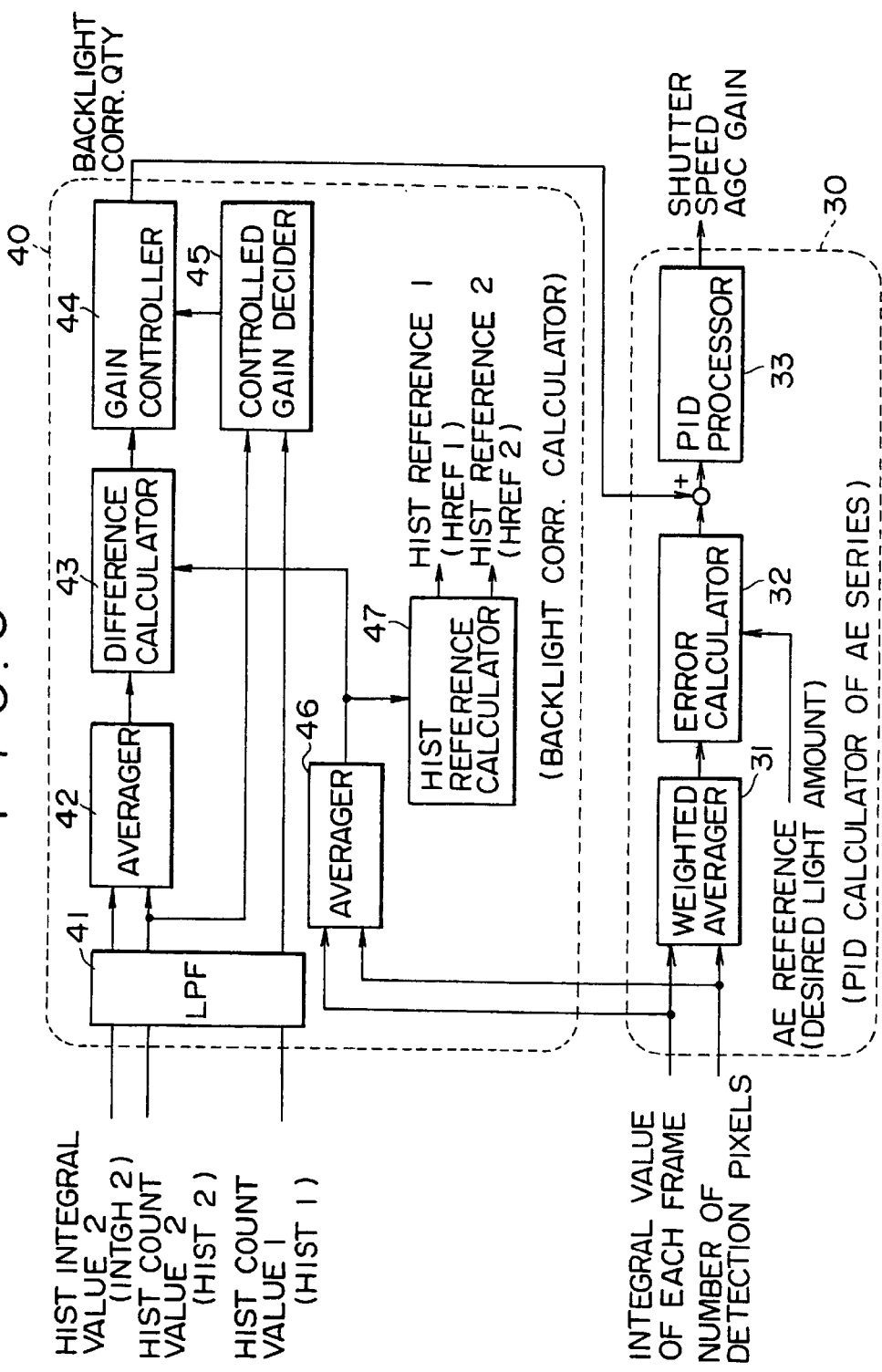
FIG. 5 is a functional block diagram showing an exemplary configuration of a software processing circuit.

FIG. 5 is a functional block diagram showing an exemplary configuration of the software processing circuit 9. This circuit 9 comprises a PID (proportional, integral and differential) calculator 30 of an AE series, and a backlight correction calculator 40.

In the PID calculator 30, first a weighted average is taken in a weighted averager 31 by the use of a simple integral value supplied from the light amount integration circuit 11 of the signal detector 8. Subsequently, an error quantity is calculated in an error calculator 32 with respect to a desired light amount (AE reference) of the weighted average obtained in the weighted averager 31. Thereafter a backlight correction quantity obtained in a backlight correction calculator 40 is added to the above error quantity, and then the result of such addition is inputted to a PID processor 33, where a shutter speed and an AGC gain are calculated. The shutter speed and the AGC gain thus obtained are supplied to the timing generator 3 and the D-A converter 10 in FIG. 1.

Next, an explanation will be given on the structure of the backlight correction calculator 40. This calculator 40 comprises a low pass filter (LPF) 41, an averager 42, a difference calculator 43 for calculating the difference from the average light amount, a gain controller 44, a controlled gain decider 45, an averager 46, and a HIST reference calculator 47.

In the backlight correction calculator 40 of the above circuit configuration, the averager 46 sums up, without weighting, the simple integral values supplied thereto from the light amount integration circuit 11 of the signal detector 8, and then executes a calculation of dividing the total by the number of detection pixels, hence obtaining the average luminance of the entire image pickup plane. The number of detection pixels represents a value which is set on the basis of the number of pixels determined by the standard of the CCD image sensor 1. The HIST reference calculator 47 sets a HIST reference level through multiplication of the average luminance of the entire plane obtained in the averager 46, by a coefficient.

Figure 6:
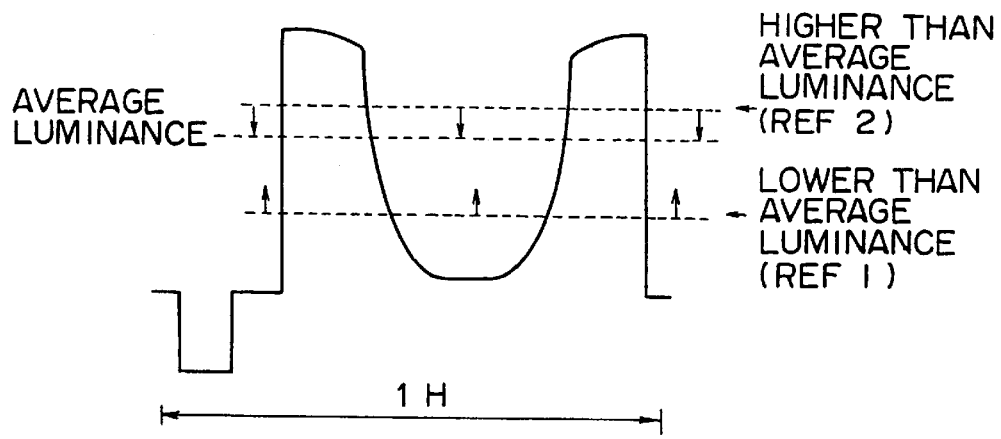
FIG. 6 graphically shows the relationship between an average luminance and a HIST reference.

More specifically, in the first series (HIST1), the coefficient is set to be less than 1 and the polarity is so set that the output of the comparator 21 in FIG. 4 becomes a logical "1" when the luminance signal is above the HIST reference level. Meanwhile in the second series (HIST2), the coefficient is set to be more than 1 and the polarity is so set that the output of the comparator becomes a logical "1" when the luminance signal is below the HIST reference level contrary to the first series. Thus, in the first series (HIST1), any background portion of relatively high luminance is detected principally, while in the second series (HIST2), any object scene portion of relatively low luminance is detected principally. FIG. 6 graphically shows the relationship between the average luminance and the HIST reference in the video signal outputted from the backlight object scene in FIG. 2.

In the LPF 41, a low-pass filtering process is executed with regard to the HIST integral value and the HIST count value supplied from the HIST detection circuit 12 of the signal detector 8. These values are widely changed in accordance with change of the HIST reference level. More specifically, the HIST reference control is so set as to perform HIST detection below the HIST reference level, and when the HIST reference level is increased from 0, there arises a change point past the luminance of the object scene and further beyond the luminance of the background. And if the values are changed widely during transition of AE control for example, the subsequent process is rendered inadequate. For this reason, temporal average values are taken.

The averager 42 is provided to conform with a CCD image sensor of a type having several different numbers of pixels. That is, the averager 42 is employed to realize calculation of the light amount in the software processing circuit 9 on the basis of the average value per pixel. In the difference calculator 43 for calculating the difference from the average light amount, backlight correction is performed with respect to the automatic exposure carried out in response to the light amount obtained through average detection. Therefore, the difference calculator 43 calculates the difference between the average luminance (average light amount) of the entire image pickup plane and the object scene luminance (light amount of object scene) obtained through HIST detection.

If the value obtained in calculating the difference from the average light amount is added directly as a backlight correction quantity to the AE control loop, it follows that the AE control is always actuated in response to the "relatively dark portion" which is regarded as the object scene. Consequently, in any object scene where the "relatively dark portion" is small, the gain is raised excessively to cause an unsatisfactory image with much white blur. And in an entirely white object scene, the control action itself is rendered contradictory.

Therefore the gain controller 44 controls the gain by the use of the HIST count value 2 corresponding principally to the area of the object scene portion and the HIST count value 1 corresponding principally to the area of the background portion, hence determining the backlight correction quantity to be added to the AE control loop of the main series. Regarding a coefficient $\alpha$ (smaller than 1) relative to the average luminance used to determine the HIST1 and a coefficient $\beta$ (greater than 1) relative to the average luminance used to determine the HIST2, the HIST count value 1 represents the number of pixels whose luminance is $\alpha$ times or more the average luminance of the entire plane, and the HIST count value 2 represents the number of pixels whose luminance is $\beta$ times or less the average luminance of the entire plane.

The sum of such HIST count values 1 and 2 is greater than the total number of pixels and smaller than a double thereof. And the value obtained by subtracting the total number of pixels in the entire plane from the above sum represents the number of pixels whose luminance is $\alpha$ times or more and β times or less the average luminance of the entire plane. Since this value is relatively great in a normal state not backlight state of an object scene object scene but relatively small in a backlight state, the controlled gain is calculated from the shift of this value as in a characteristic diagram of FIG. 7A. Thus, proper correction of the backlight can be realized by adding the backlight correction quantity, which is obtained in the backlight correction calculator 40, to the AE control loop of the main series.

Hereinafter processing routines executed for exposure control actions in the exposure controller of the above structure will be described with reference to flowcharts of FIGS. 8A and 8B which relate to the backlight correction calculator and the AE control loop respectively.

First, an explanation will be given on the processing routine executed in the backlight correction calculator. In a flowchart of FIG. 8A, luminance signals (light amounts) obtained from the DSP 6 in shooting an object scene by the CCD image sensor 1 are integrated (step S11), and the integral value is divided by the number of detection pixels to obtain an average luminance (average light amount) of the entire image pickup plane (step S12). Subsequently, the average luminance of the entire plane thus obtained is multiplied by a coefficient to calculate a HIST reference level (step S13).

Next, HIST detection is performed on the basis of such HIST reference level to calculate a HIST integral value and a HIST count (count value of pixels), whereby the object scene portion is separated, and the size and the light amount thereof are calculated (step S14). Then the difference between the average luminance of the entire plane obtained at step S12 and the luminance of the object scene portion is calculated (step S15). Thereafter a gain control action is performed with respect to the luminance difference thus found, thereby calculating a required backlight correction quantity (step S16).

Now the processing routine executed in the AE control loop will be explained below. In FIG. 8B, the integral value obtained at step S11 of FIG. 8A is inputted (step S21), and an error quantity in the weighted average of the input integral value to a desired light amount is calculated (step S22). Next, the backlight correction quantity obtained at step S16 of FIG. 8A is added to the error quantity (step S23), and then PID operations are performed to calculate a shutter speed and an AGC gain (step S24).

Subsequently, the timing of the electronic shutter determined by the timing generator 3 of FIG. 1 and the AGC gain of the preamplifier 4 are so controlled as to coincide with the calculated shutter speed and AGC gain (step S25). Thus, a backlight correction is achieved by the processes mentioned above.

As described, the image pickup plane is separated into an object scene portion and a background portion, and the degree of the backlight condition of the object scene portion is detected by detecting the light amount of the object scene portion, and then AE control is executed in accordance with the backlight correction quantity which corresponds to the difference of the brightness (luminance) of the object scene portion from that of the entire image pickup plane, hence ensuring exact prevention of an undesired phenomenon that the object scene in a backlight state is rendered dark. Further, due to detection of the light amount of the object scene portion, the exposure is changed merely slightly despite any displacement of the object scene in the image pickup plane, and therefore the backlight correction is not varied by the position of the object scene.

Figure 9:
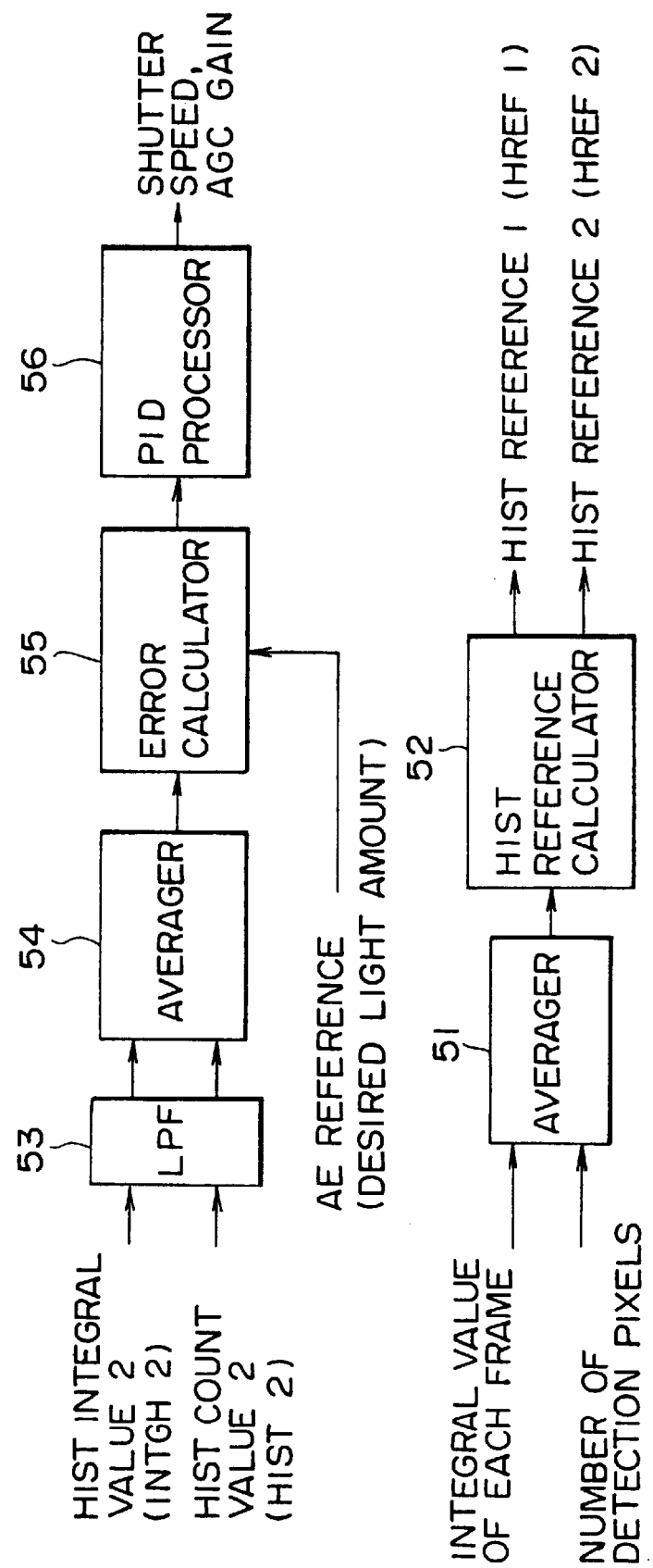
FIG. 9 is a block diagram showing a modified example of the software processing circuit.

FIG. 9 shows a modified example of the software processing circuit 9 in the embodiment. In this modification, the gain control process employed in the aforementioned software processing circuit 9 shown in FIG. 5 is omitted for the purpose of down-sizing the circuit.

That is, the software processing circuit according to this modification comprises an averager 51, a HIST reference calculator 52, an LPF 53, an averager 54, an error calculator 55 and a PID calculator 56.

The functions of the component elements in the software processing circuit of this modification are fundamentally the same as those of the component elements in the aforementioned software processing circuit 9 of the foregoing embodiment. More specifically, the averager 51 sums up, without weighting, the simple integral values supplied thereto from the light amount integrating circuit 11 of FIG. 1, and then executes a calculation of dividing the sum by the number of detection pixels to thereby obtain an average luminance of the entire image pickup plane. Subsequently the HIST reference calculator 52 sets a HIST reference through multiplication of the average luminance of the entire plane obtained in the averager 51, by a coefficient. And the HIST reference thus set is supplied to the HIST detection circuit 12 of FIG. 1.

Meanwhile in the LPF 53, a low-pass filtering process is executed with regard to the HIST integral value and the HIST count value supplied from the HIST detection circuit 12 of FIG. 1. The averager 42 serves to average the output of the LPF 53 for calculating the light amount on the basis of the average value per pixel in the software processing circuit. The error calculator 55 calculates an error quantity of the average value, which is outputted from the averager 42, to a desired light amount (AE reference). And then the PID calculator 56 performs PID operations relative to the error quantity obtained in the error calculator 55, thereby calculating a shutter speed and an AGC gain.

Thus, also in the exposure controller equipped with the software processing circuit of the above configuration, the object scene portion in the image pickup plane is separated according to the luminance, and depending on the light amount and the size of the object scene portion, AE control is executed only on the basis of the light amount below a certain luminance including the object scene. Therefore, as in the foregoing embodiment, it becomes possible to ensure exact prevention of an undesired phenomenon that the object scene in a backlight state is rendered dark. Further, the exposure is changed merely slightly despite any displacement of the object scene in the image pickup plane, and the backlight correction is not varied by the position of the object scene.

In addition, the software processing circuit is down-sized due to omission of a gain control process, so that one series of the HIST detection circuit shown in FIG. 4 is sufficient to meet the requirement, hence achieving another advantage of down-sizing both hardware and software as well.

FIG. 10 is a fundamental block diagram of a whole system showing another embodiment relative to a camera of the present invention. In contrast with the foregoing embodiment representing a system which executes AE control by controlling a shutter speed and an AGC gain, this embodiment represents a system to execute AE control by controlling the diaphragm of an iris provided in an optical path of incident light to a CCD image sensor.

In FIG. 10, incident light from an object scene to be shot falls on an image pickup plane of a solid-state image sensor such as a CCD image sensor 61 via a lens 62 and an iris 63.

The CCD image sensor 61 controls reading of signal charge, vertical transfer and horizontal transfer thereof in response to various timing signals generated from a timing generator (TG) 64, thereby converting the incident light into an electric signal of each unit pixel and outputting the same as an image signal. The diaphragm of the iris 63 is controlled by an iris driver 65.

The image signal thus outputted from the CCD image sensor 61 is supplied to a preamplifier 66, where the signal component is sampled and held, and further automatic gain control (AGC) is performed for adjustment to a proper level. The image signal obtained in an analog form through the preamplifier 66 is converted into a digital signal by an A-D converter 67 and then is supplied to a DSP 68, where the signal is processed in predetermined manners and is outputted as a video signal.

An exposure controller 70 is provided to execute AE control inclusive of backlight correction. This exposure controller 70 comprises an LPF 71, an amplifier 72, a differential amplifier 73, an AE reference generator 74 for generating an AE reference level (desired light amount), a signal detector 75, and a backlight correction calculator (software processor) 76. The signal detector 75 consists of a light amount integration circuit 77 for executing simple integration of luminance signals supplied from the DSP 68 and obtaining a simple integral value (light amount); and a HIST detection circuit 78 for executing HIST detection of the luminance signal.

In the exposure controller 70 of the above structure, the LPF 71 averages the luminance components of image signals outputted from the preamplifier 66 and then supplies its luminance average value via the amplifier 72 to an inverting (−) input of the differential amplifier 73.

In the meantime, the differential amplifier 73 receives, at its non-inverting (+) input, the AE reference level generated in the AE reference generator 74. The difference between the luminance average value and the AE reference level is supplied as an AE correction quantity to the iris driver 65 for controlling the diaphragm of the iris 63.

Meanwhile the HIST detection circuit 78 of the signal detector 75 executes HIST detection of the luminance signal supplied thereto from the DSP 68, in response to the HIST reference level outputted from the backlight correction calculator 76, thereby obtaining a HIST integral value and a HIST count value (pixel count value). The circuit configuration of the HIST detector 75 employed in this embodiment is the same as that of the HIST detector shown in FIG. 4.

The backlight correction calculator 76 detects the light amount of the entire image pickup plane on the basis of the simple integral value and the number of detection pixels supplied from the light amount integration circuit 77 of the signal detector 75, and further detects the light amount of the object scene portion on the basis of the HIST integral value and the HIST count value supplied from the HIST detection circuit 78, and then calculates the difference between the light amount of the entire plane and that of the object scene portion as a backlight correction quantity. The circuit configuration of the backlight correction calculator 76 employed in this embodiment is the same as that of the backlight correction calculator 40 shown in FIG. 5.

The backlight correction quantity thus obtained is used as a control signal for controlling the AE reference level generated from the AE reference generator 74. Consequently, the backlight correction quantity is added to the AE control quantity in the normal AE control loop which is formed of CCD image sensor 61→preamplifier 66→LPF 71→amplifier 72→differential amplifier 73→iris driver 65→iris 63. Thus, also in the system of the above constitution where AE control is executed by controlling the diaphragm of the iris 63, it is possible to achieve the same advantageous effects as those mentioned in the foregoing embodiment.

More specifically, the object scene portion in the image pickup plane is separated according to the luminance, and after the light amount of the object scene portion is detected, the difference thereof from the light amount of the entire plane is calculated as a backlight correction quantity. Then AE control is executed on the basis of such backlight correction quantity, hence ensuring exact prevention of a phenomenon that the object scene in a backlight state is rendered dark. Further, the exposure is changed merely slightly despite displacement of the object scene in the plane, so that the backlight correction is not affected by the position of the object scene.

Any of the embodiments mentioned is so constituted as to control the AE reference in accordance with the calculated backlight correction quantity. However, since the luminance average value obtained through the averaging process in the LPF 71 is relative to the AE reference, it is a matter of course that the constitution may be modified in a manner to control the luminance average value.

Thus, according to the present invention, the brightness of the object scene in the image pickup plane is detected separately from the background portion, and exposure control is executed on the basis of the detection output. Therefore, exposure control can be carried out only with regard to the brightness of the object scene alone, hence ensuring exact prevention of an undesired phenomenon that the object scene in a backlight state is rendered dark. Moreover, in comparison with any ordinary method applying the fuzzy theory or the like, the software processing series can be down-sized without the necessity of any complicated process such as functional operation. Furthe, due to detection of the light amount of the object scene portion, the exposure is changed slightly despite displacement of the object scene in the image pickup plane, and the backlight correction is not varied by the position thereof.

Although the present invention has been described hereinabove with reference to some preferred embodiments, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

| FIG. 1 | |
| --- | --- |
| 4 | Preamplifier |
| 5 | A-D converter |
| 6 | DSP    Video signal output |
| 10 | D-A converter |
| 11 | Light amount integrator |
| 12 | HIST detector |
|  | HIST integral value |
|  | HIST count value |
|  | HIST reference |
|  | Integral value |
| 30 | PID calculator |
| 40 | Backlight corr. calculator |

-continued

FIG. 2

Figure 7A:
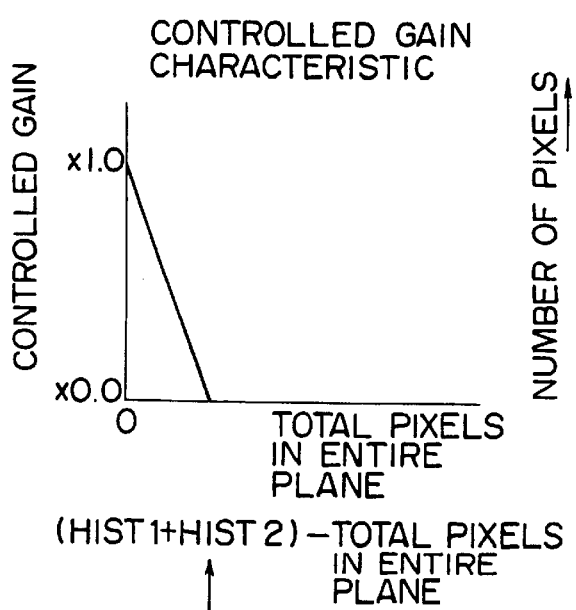
FIGS. 7A and 7B graphically show the characteristics applied to determination of a controlled gain.
Figure 7B:
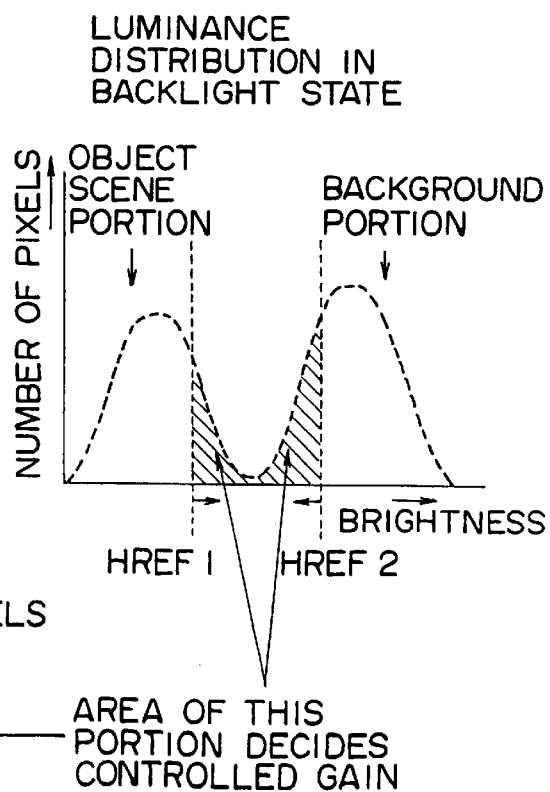
Figure 8A:
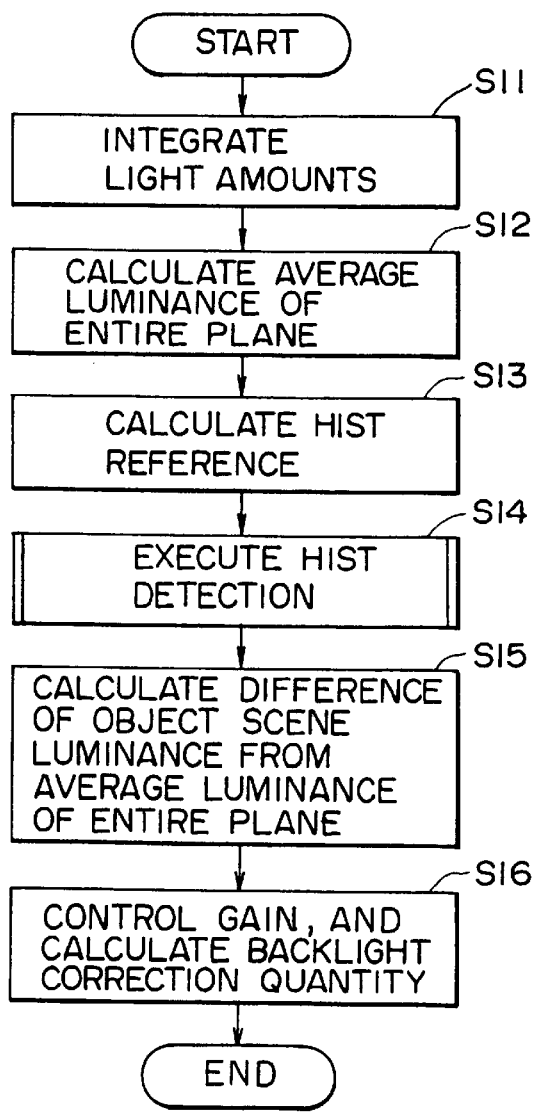
FIGS. 8A and 8B are flowcharts of routines executed in an exposure control method of the present invention.
Figure 8B:
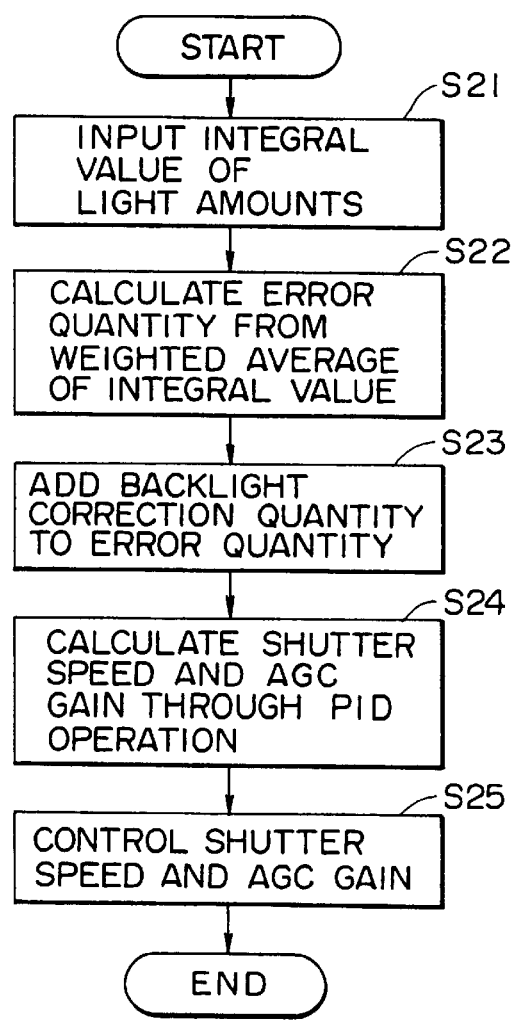

| | | |
|---|---|---|
| FIG. 3A | Only this portion is detected.<br>Normal state | |
| FIG. 3B | Number of pixels    Luminance<br>Backlight state | |
| FIG. 4 | Number of pixels    Luminance<br>Object scene portion    Background portion<br>This portion is used for AE control. | |
| 21 | Luminance signal    HIST integral value<br>HIST reference<br>Comparator    HIST count value<br>HIST reference control | |
| FIG. 5 | | |
| 40<br>41<br>42<br>43<br>44<br>45<br>46<br>47<br><br>30<br>31<br>32<br>33 | HIST integral value 2 (INTGH 2)<br>HIST count value 2 (HIST 2)<br>HIST count value 1 (HIST 1)<br>(Backlight corr. calculator)<br>LPF<br>Averager<br>Difference calculator<br>Gain controller    Backlight corr. qty<br>Controlled gain decider<br>Averager<br>HIST reference calculator<br>HIST reference 1 (HREF 1)<br>HIST reference 2 (HREF 2)<br>Integral value of each frame<br>Number of detection pixels<br>(PID calculator of AE series)<br>Weighted averager<br>Error calculator<br>PID processor    Shutter speed, AGC gain<br>AE reference (Desired light amount) | |
| FIG. 6 | | |
| FIG. 7A | Average luminance<br>  Higher than average luminance (REF 2)<br>  Lower than average luminance (REF 1)<br>Controlled gain characteristic | |
| FIG. 7B | Controlled gain    Total pixels in entire plane<br>(HIST1 + HIST2) - Total<br>pixels in entire plane<br>Luminance distribution in backlight state | |
| FIG. 8A | Number of pixels    Brightness<br>Object scene portion    Background portion<br>Area of this portion decides controlled gain.<br>Backlight correction calculator | |
| S11<br>S12<br>S13<br>S14<br>S15<br><br>S16 | Start<br>Integrate light amounts<br>Calculate average luminance of entire plane<br>Calculate HIST reference<br>Execute HIST detection<br>Calculate difference of object scene luminance from<br>average luminance of entire plane<br>Control gain, and calculate backlight correction<br>quantity<br>End | |
| FIG. 8B | AE control loop | |
| S21<br>S22<br><br>S23<br>S24<br><br>S25 | Start<br>Input integral value of light amounts<br>Calculate error quantity from weighted average of<br>integral value<br>Add backlight correction quantity to error quantity<br>Calculate shutter speed and<br>AGC gain through PID    operation<br>Control shutter speed and AGC gain<br>End | |

FIG. 9

| 53<br>54<br>55<br>56<br><br><br><br>51<br>52 | HIST inteqral value 2 (INTGH 2)<br>HIST count value 2 (HIST 2)<br>LPF<br>Averager<br>Error calculator<br>PID processor    Shutter speed, AGC gain<br>AE reference (Desired light amount)<br>Integral value of each frame<br>Number of detection pixels<br>Averager<br>HIST reference calculator<br>HIST reference 1 (HREF 1)<br>HIST reference 2 (HREF 2) |
|---|---|

FIG. 10

| 65 | Iris driver |
|---|---|
| 66 | Preamplifier |
| 68 | DSP    Video signal output |
| 67 | A-D converter |
| 74 | AE reference |
| 76 | Backlight corr. calculator |
| 77 | HIST detector |
| 78 | Light amount integrator |

What is claimed is:

1. An exposure controller comprising:
a detection means for separating an image pickup plane into an object scene portion and a background portion, the location of said object scene portion within the image pickup plane being unrestricted, and detecting the brightness of the object scene portion; and
a control means for executing exposure control on the basis of the output of said detection means,
wherein said detection means has an average luminance calculation means for calculating the average luminance of the entire image pickup plane; reference level setting means for setting first and second reference levels on the basis of the average luminance calculated by said average luminance calculation means; and a separation means for separating the object scene portion on the basis of said first reference level while separating the background portion on the basis of said second reference level.

2. The exposure controller according to claim 1, wherein said first reference level is higher than the average luminance level, and said second reference level is lower than the average luminance level.

3. The exposure controller according to claim 1, wherein said detection means further has a first integration means for integrating the luminance of the object scene portion separated on the basis of said first reference level.

4. The exposure controller according to claim 1, wherein said detection means further has a first count means for counting the number of pixels of the object scene portion separated on the basis of said first reference level.

5. The exposure controller according to claim 1, wherein said detection means further has a second integration means for integrating the luminance of the background portion separated on the basis of said second reference level.

6. The exposure controller according to claim 1, wherein said detection means further has a second count means for counting the number of pixels of the background portion separated on the basis of said second reference level.

7. The exposure controller according to claim 1, further comprising:
an averaging means for detecting the average luminance of the object scene portion; and a difference detection means for detecting the difference between the average luminance of the object scene portion detected by said averaging means, and the average luminance of the entire plane calculated by said average luminance calculation means;

wherein said control means executes exposure control on the basis of the output of said difference detection means.

8. The exposure controller according to claim 4 or 6, further comprising a gain control means for controlling the gain with respect to the output of said difference detection means on the basis of the correlation between the result of adding the pixel count values of said first and second count means and the number of pixels of the entire image pickup plane; wherein said control means executes the exposure control on the basis of the output of said gain control means.

9. An exposure control method for automatically controlling the brightness of an image pickup plane, comprising the steps of:

detecting the average luminance of the entire image pickup plane, and setting first and second reference levels on the basis of such average luminance;

separating the image pickup plane into an object scene portion and a background portion on the basis of said first and second reference levels, and detecting the average luminance of the object scene portion;

calculating the difference between the average luminance of the entire plane and that of the object scene portion; and controlling the exposure on the basis of the difference thus calculated.

10. The exposure control method according to claim 9, further comprising a step of controlling the gain with respect to the calculated luminance difference on the basis of the correlation between the sum total of pixels of the object scene portion and the background portion, and the number of pixels of the entire plane, wherein the exposure control is executed on the basis of the difference after the gain is controlled.

11. A camera comprising:

an image sensor for converting incident light into an electric signal and outputting the same;

an optical system for guiding the incident light from an object scene onto an image pickup plane of said image sensor;

a signal processing means for processing the output signal of said image sensor;

a detection means for separating the image pickup plane into an object scene portion and a background portion on the basis of the signal supplied from said signal processing means, the location of said object scene portion within the image pickup plane being unrestricted, and then detecting the brightness of the object scene portion; and a control means for executing exposure control with regard to said image sensor on the basis of the output of said detection means, wherein said detection means has an average luminance calculation means for calculating the average luminance of the entire image pickup plane; reference level setting means for setting first and second reference levels on the basis of the average luminance calculated by said average luminance calculation means; and a separation means for separating the object scene portion on the basis of said first reference level while separating the background portion on the basis of said second reference level.

12. The camera according to claim 11, wherein said first reference level is higher than the average luminance level, and said second reference level is lower than the average luminance level.

13. The camera according to claim 11, wherein said detection means further has a first integration means for integrating the luminance of the object scene portion separated on the basis of said first reference level.

14. The camera according to claim 11, wherein said detection means further has a first count means for counting the number of pixels of the object scene portion separated on the basis of said first reference level.

15. The camera according to claim 11, wherein said detection means further has a second integration means for integrating the luminance of the background portion separated on the basis of said second reference level.

16. The camera according to claim 11, wherein said detection means further has a second count means for counting the number of pixels of the background portion separated on the basis of the second reference level.

17. The camera according to claim 11, further comprising:

an averaging means for detecting the average luminance of the object scene portion; and a difference detection means for detecting the difference between the average luminance of the object scene portion detected by said averaging means, and the average luminance of the, entire plane calculated by said average luminance calculation means;

wherein said control means executes exposure control on the basis of the output of said difference detection means.

* * * * *